3,106,555
NOVEL AMINO CHLOROSULFENYL-S-TRIAZINES, THEIR HYDROCHLORIDES AND PROCESS FOR THEIR PRODUCTION
Werner Schwarze, Frankfurt am Main, Germany, assignor to Deutsche Gold- und Silber-Scheideanstalt vormals Roessler, Frankfurt am Main, Germany
No Drawing. Filed Aug. 25, 1961, Ser. No. 133,799
Claims priority, application Germany Sept. 2, 1960
1 Claim. (Cl. 260—249.5)

The present invention relates to novel amino chlorosulfenyl-s-triazines of the formulae

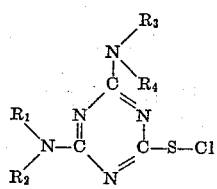

or

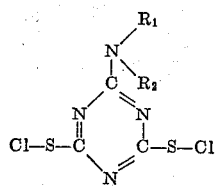

and a process for their preparation. In such formulae, each of $R_1$, $R_2$, $R_3$ and $R_4$ can be hydrogen, alkyl, cycloalkyl, aralkyl or aryl.

It is known that thiophenols can be converted to aromatic sulfenyl chlorides with chlorine or to produce such sulfenyl chlorides by a chlorinating cleavage of the corresponding disulfides. It is also known that treatment of disulfides of cyclic amines with a halogen in the absence of water will yield aminosulfenyl halides.

According to the invention it was found that upon reaction of amino mercaptotriazines with sulfuryl chloride high yields of the corresponding chlorosulfenyl triazines are obtained in a well crystallized form and in a smoothly proceeding reaction. In the event that the amino chlorosulfenyl triazines are of sufficiently basic reaction it is possible to produce the corresponding hydrochlorides therefrom. Such hydrochlorides are also novel.

The process according to the invention is preferably carried out in inert solvents, such as carbon tetrachloride, benzene, mono- and dichloro benzene, toluene and the like. Stoichiometric quantities of sulfuryl chloride for the conversion of the mono- or dimercapto diamino or monoamino triazines can be used but it is expedient to employ a slight excess (10–20% of the theoretical). The reaction can be carried out at temperatures between 0° and 80° C. but usually is carried out at room temperature. In some instances, however, it is necessary to raise the temperature up to about 80° C. in order to obtain quantitative conversions.

The reaction can also be carried out by using sulfuryl chloride as solvent. In such a case it is necessary to use the sulfuryl chloride in a greater excess over the stoichiometric quantity.

It is possible to use chlorine as chlorinating agent. Hereby it is essential to work at low temperatures to avoid the formation of by-products.

The chlorosulfenyl triazines according to the invention can be used directly as fungicides in the form of solutions, emulsions, dispersions or powder and also are valuable intermediates in the preparation of vulcanization accelerators and other fungicidal substances.

The following examples will serve to illustrate several embodiments of the invention.

Example 1

12.75 g. of 2,4-bis-diethylamino-6-mercapto-s-triazine were suspended in 100 cc. of carbon tetrachloride and 8 g. of sulfuryl chloride added thereto, all at once, while stirring. The mercaptotriazine dissolved soon thereafter. After standing some time, 13 g. of 2,4-bis-diethylamino-6-chlorosulfenyl-s-triazine-hydrochloride precipitated as a fine crystalline light yellow precipitate which was filtered off on a suction filter and washed with petroleum ether. The melting point of such crystals was 115° C. A further 1.7 g. of product was recoverable from the mother liquor.

Example 2

11.35 g. of 2-n-propylamino-4-isopropylamino-6-mercapto-s-triazine were mixed with 8 g. of sulfuryl chloride in 100 cc. of carbon tetrachloride. The reaction proceeded and recovery of the product was carried out as in Example 1. 14.6 g. of 2-n-propylamino-4-isopropylamino-6-chlorosulfenyl-s-triazine hydrochloride of a melting point of 187° C. were obtained as light yellow crystals.

Example 3

13.9 g. of 2-o-chloroanilido-4,6-dimercapto-s-triazine were mixed with 100 cc. of carbon tetrachloride and 16 g. of sulfuryl chloride and stirring first for 1 hour at room temperature and then for 1 hour at 40–45° C. The reaction mixture was evaporated to dryness, triturated with petroleum ether and suction filtered. 13.5 g. of 2-o-chloroanilido-4,6-bis-chlorosulfenyl-s-triazine were obtained in the form of yellow crystals of an unsharp melting point from 140° C. on.

Example 4

11.25 g. of 2-o-chloroanilido-4-ethylamino-6-mercapto-s-triazine were reacted with 6.75 g. of sulfuryl chloride in 100 cc. of chlorobenzene. The reaction mixture was first stirred for 1 hour at room temperature and then while continuing the stirring the temperature was slowly raised to 80° C. in 30 minutes. The product was recovered as in Example 1. 12.5 g. of 2-o-chloro-4-ethylamino-6-chlorosulfenyl-s-triazine of a melting point of 192° C. were obtained.

Example 5

18.8 g. of 2,4-bis-mercapto-6-ethylamino-s-triazine were suspended in 200 cc. of benzene and 33 g. of sulfuryl chloride added thereto at room temperature. The mixture was stirred for 1 hour at room temperature, then for 2 hours at 45° C. and then for 1 hour at 60° C. The product was recovered as in Example 3. 24.1 g. of 2,4-bis-chlorosulfenyl-6-ethylamino-s-triazine were obtained in the form of yellow crystals of an unsharp melting point of 140° C. on.

Example 6

40 cc. of sulfuryl chloride were placed in a round flask and 10 g. of 2,4-bis-ethylamino-6-mercapto-s-triazine introduced at room temperature. The mercaptotriazine dissolved soon thereafter. After solution was completed the reaction mixture was stirred for a further 2 hours. The reaction mixture was evaporated to dryness under vacuum using a water bath having a maximum temperature of 40° C. 13.1 g. of 2,4-bis-ethylamino-6-chlorosulfenyl-s-triazine hydrochloride remained as the residue. (Yield 97.5% of the theoretical.)

*Example 7*

10 g. of 2,4-bis-ethylamino-6-mercapto-s-triazine were suspended in 125 cc. of carbon tetrachloride and the mixture cooled to 0° C. and 7.2 g. chlorine introduced at this temperature. The reaction was completed at the moment when all of the mercaptotriazine had dissolved. The reaction mixture was immediately evaporated to dryness under vacuum. 12.9 g. of 2,4-bis-ethylamino-6-chlorosulfenyl-s-triazine - hydrochloride were obtained. (Yield 95.5% of the theoretical.)

*Example 8*

24.85 g. of 2-ethylamino-4-cyclohexylamino-6-mercapto-s-triazine were suspended in 200 cc. of benzene and 16 g. of sulfuryl chloride were added at room temperature. The mercaptotriazine fastly dissolves. After stirring during 30 minutes ligroin was added whereby the sulfenyl compound is precipitated. After filtering off and drying 31.5 g. of 2-ethylamino-4-cyclohexylamino-6-chlorosulfenyl-s-triazine-hydrochloride were obtained. The melting point of the white crystals was 180° C.

*Example 9*

21.8 g. of 2-ethylamino-4-benzylamino-6-mercapto-s-triazine were reacted with 16 g. of sulfuryl chloride as described in Example 8. 32.1 g. of 2-ethylamino-4-benzylamino - 6 - chlorosulfenyl-s-triazine-hydrochloride were obtained. The melting point of the yellowish crystals was 163° C.

I claim:

An amino-chlorosulfenyl-s-triazine compound selected from the group consisting of compounds of the formulae

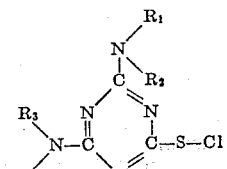

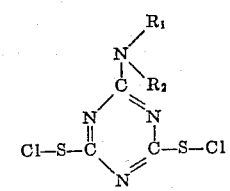

and the hydrochloride salts thereof wherein $R_1$, $R_2$, $R_3$ and $R_4$ are selected from the group consisting of hydrogen, lower alkyl, cyclohexyl, phenyl lower alkyl and phenyl.

References Cited in the file of this patent

Reid: "Organic Chemistry of Bivalent Sulfur," vol. 1, pages 124–25, 265–270, Chemical Publishing Co. (1958).

Smolin et al.: "S–Triazines and Derivatives," page 299, Interscience Publishers, Inc. (1959).